United States Patent [19]

Schlegel et al.

[11] 4,165,313

[45] Aug. 21, 1979

[54] PROCESS FOR DEODORIZING FOAMING AGENTS FOR THE MANUFACTURE OF AIR FOAMS

[75] Inventors: Albert Schlegel, Frankfurt am Main; Peter Wirtz, Königstein, both of Fed. Rep. of Germany

[73] Assignee: Hoechst Aktiengesellschaft, Frankfurt am Main, Fed. Rep. of Germany

[21] Appl. No.: 792,909

[22] Filed: May 2, 1977

[30] Foreign Application Priority Data

May 3, 1976 [DE] Fed. Rep. of Germany ....... 2619088

[51] Int. Cl.[2] ........................... A23J 1/10; C07G 7/06

[52] U.S. Cl. ............................. 260/123.7; 260/112 R; 260/112 B; 260/121

[58] Field of Search ................. 260/112 R, 121, 123.7

[56] References Cited

U.S. PATENT DOCUMENTS

| | | | |
|---|---|---|---|
| 1,979,601 | 11/1934 | Bauer et al. | 260/119 X |
| 2,131,145 | 9/1938 | Schlack | 260/119 X |
| 2,680,101 | 6/1954 | Schibler et al. | 260/6 |
| 2,727,027 | 12/1955 | Monson et al. | 260/112 R |
| 2,882,252 | 4/1959 | Baker | 260/6 |
| 3,202,748 | 8/1965 | Naka et al. | 264/194 |
| 3,207,613 | 9/1965 | Merrill | 106/135 |
| 3,522,197 | 7/1970 | Aranyi et al. | 260/8 |

FOREIGN PATENT DOCUMENTS

| | | |
|---|---|---|
| 752692 | 5/1953 | Fed. Rep. of Germany . |
| 1090673 | 10/1960 | Fed. Rep. of Germany . |

*Primary Examiner*—Walter C. Danison

*Attorney, Agent, or Firm*—Curtis, Morris & Safford

[57] ABSTRACT

A process is disclosed for deodorizing protein hydrolysates which are used for making air foam. Protein is hydrolyzed by known methods in the absence of heavy metal salts. Then an epoxide is added until blackening occurs when a spot-test is carried out with lead acetate paper.

6 Claims, No Drawings

PROCESS FOR DEODORIZING FOAMING AGENTS FOR THE MANUFACTURE OF AIR FOAMS

For the production of so-called stable air foams for fire-extinguishing purposes and other types of use, mixtures are known that contain weakly alkaline foam extracts based on water-soluble protein decomposition products, protective colloids and, if necessary, metal compounds for the purpose of foam stabilization. To produce the stock solutions, proteins or protein-containing materials of animal or vegetable origin are subjected in a pressure tank to an acid, neutral or alkaline decomposition at temperatures of approximately 100°-200° C. and are subsequently made weakly alkaline. Generally the resulting stock solutions contain 40-50% by weight of dissolved protein decomposition products. In the art, preference is usually given to alkaline decomposition (German Pat. No. 833 594).

It is possible to use as protective colloid, for example, sulfite waste liquor (German Pat. No. 697 646). The metal compounds that may be added in order to render the air foam later produced more stable may be either metal salts such as iron-II-sulfate or metal complex salts (German Pat. No. 1 090 673). For the purpose of increasing the resistance to freezing, water-soluble alcohols, for example, methanol or butylene glycol, may be added to the stock solutions.

In the case of hydrolytic decomposition of the protein-containing starting materials, hydrogen sulfide and thiols are always evolved, as a result of which the resulting gases and the stock solution formed smell extremely umpleasant. To prevent hydrogen sulfide and thiols from being produced it has already been proposed to add metal salts, in the case of alkaline decomposition, that are capable of absorbing the sulfur compounds evolved in the form of difficulty-soluble metal salts, for example iron(II)-sulfate (Belgian Pat. No. 589 359).

It is likewise possible for the mentioned metal salts to be added at the end of the decomposition. Although it is possible by this means satisfactorily to prevent the repulsive smell from occurring, the sulfur-containing and metal-containing precipitates simultaneously produced are very voluminous. The volume of the precipitate, determined by centrifuging, is about 100 times greater than that of equivalent amounts of pure metal sulfide precipitates. This is probably a result of the high protein content of the solutions. Although these precipitates can be separated from the crude decomposition products, owing to the high proportion of liquid phase a considerable percentage of the protein-containing decomposition product is lost.

A process is known from German Pat. No. 752 692 for producing protein decomposition products that are free of unstable sulfur compounds, in which the sulfur-containing protein substances are hydrolyzed in alkaline medium and reacted with organic compounds that carry halogen atoms that split off easily, such as, for example, chloroacetic acid, to form thioethers. It has been shown, however, that the foaming behavior of products stabilized in this manner is substantially impaired.

The problem therefore arose of deodorizing protein decomposition products obtained hydrolytically, without using heavy metal salts and without impairing the foamactive action of the protein hydrolyzate.

A process has now been found for the production of protein decomposition products that are free of pungent sulfur compounds for the manufacture of air foams, by hydrolyzing proteins in the absence of heavy metal salts, which process is characterized in that an epoxide is added to the protein hydrolyzate until blackening no longer occurs when spotting is carried out with lead acetate paper.

Epoxides having 2 to 6 carbon atoms, preferably 2 to 4 carbon atoms, in particular 2 and 3 carbon atoms, are especially suitable. Decomposition of the protein in alkaline medium is preferred, for example with lime, soda or ammonia (cf. Ullmann, Enziklopaedie der technischen Chemie, 3rd edition, Volume 7, page 573).

The addition of the epoxide is possible over a wide pH range. The pH values preferably used are from 7 to 12, in particular 8 to 11. The quantity of epoxide necessary for deodorization seems to depend on its molecular weight. For 1 kg of crude decomposition product (content approximately 40% protein hydrolyzate) up to 1.1 mole of propylene oxide are used, but only 0.75 mole of ethylene oxide and only 0.36 mole of epichlorohydrin.

Epichlorohydrin has proved substantially more effective than the other epoxides. In this case there is also (in contrast to the halogen-free epoxides) a connection between the pH value of the solution and the quantities of the epoxide necessary for complete deodorization. For example, for 1 kg of crude decomposition product (decomposed with ammonia; pH value 9.5) approximately 33 g of epichlorohydrin are needed. If, however, the crude decomposition product is neutralized with acid, as the quantity of acid increases, the quantity of epichlorohydrin required beomes less. If 120 ml of 20% strength sulfuric acid (or the equivalent quantity of another acid) are added to 1 kg of crude decomposition product (content approximately 40% protein hydrolyzate) the required quantity of epichlorohydrin finally reaches a minimum (10 g/kg of crude decomposition product). In this case the pH value is 8.9 before the beginning of the addition of the epoxide and 8.0 once the addition of epichlorohydrin is complete. If further acid is added, the required quantity of epichlorohydrin increases again.

If using epichlorohydrin, the process according to the invention is therefore best carried out at a pH value of 8.5±0.5. The preferred upper limit for the pH value used is approximately 10, especially 9.5. A preferred lower limit for the pH value used in approximately 7.0, preferably 7.5.

The quoted pH values were measure by glass electrodes in undiluted solutions. If, in order to prevent damage of the glass electrodes by the protein substances, the solutions are diluted by 100 times their volume with water before measuring, the measured pH values are lower by approximately 0.3 to 0.5 pH units.

It is worthy of note that when using aliphatic chlorohydroxy compounds that react in alkaline medium to form epoxides, substantially greater input quantities are necessary (ethylene chlorohydrin: 0.62 mole; 2,3-dichloropropan-1-ol: 2.3 moles per kg of crude decomposition product). This and the fact that the foaming behavior of the protein decomposition product treated with epoxide is not impaired, indicates that the conversion of the ethylene chlorohydrin into ethylene oxide in the process according to German Pat. No. 752 692 plays no part.

The stock solution deodorized in accordance with the invention may also have added to it salts of bivalent metals such as zinc and iron, in order to improve the foam stability. Also, other additions known per se, such as, for example, anti-frost agents, can be added. A particular advantage of the process according to the invention is that even after standing for a relatively long time (in particular in the presence of zinc ions) no sulfide-containing precipitates are produced.

When the autoclave is opened after decomposition is complete, first of all the hydrolysis products in gaseous form (hydrogen sulfide, thiols) must be rendered harmless. This can be effected, for example, in a manner known per se by combustion by means of an auxiliary flame or by introducing the gases into hypoclorite solution (preferably above a pH of 7). Subsequently the liquid phase is treated according to the process of the invention.

Since in the process according to the invention, a heavy metal sulfide precipitate capable of absorbing protein is no longer produced, the yield of protein hydrolyzate is also increased. In comparision with the removal of sulfur using iron salts, with the same input approximately 30% higher yields are obtained.

The proteins that can be used are known to the man skilled in the art. For example, albumins, globulins and hemoglobin may be used, but preferably keratin-containing substances, such as horn meal, are used.

The temperature at which the epoxide is added is not critical. Temperatures of 40° to 100° C., preferably 60° to 80° C., have proved suitable.

The reaction of the epoxide with the reactive sulfur-containing substances proceeds very rapidly. The determination of the end product by spot analysis using lead acetate paper is therefore easily possible.

The following examples serve to illustrate the invention.

EXAMPLE 1

10 kg of horn shavings, 1.5 kg of iron-(II)-sulfate-heptahydrate, 10.5 l of drinking water and 3.25 kg of aqueous ammonia solution (25% by weight $NH_3$) are treated for one hour in a pressure tank at 160°–170°. The mixture is then cooled to approximately 80° C., small quantities of flocculating agent are added, and the iron sulfide sludge is separated off in a decanter. The pH value of the hydrolyzate is approximately 9.5. Yield: 17.6 kg (content: 40% by weight of protein hydrolyzate).

EXAMPLE 2

The procedure is as in Example 1, except that the iron-(II)-sulfate is omitted. After cooling to 70° C., the pH value is approximately 10.0. 1.2 l of 20% strength sulfuric acid are added and neutralization to a pH of 8.9 is effected thereby. At 70° C., 100 g of epichlorohydrin are added over a period of 30 minutes. After this, blackening no longer occurs when spotting is carried out using lead acetate paper. Yield: 25 kg of hydrolyzate (content: 40% by weight of protein hydrolyzate).

We claim:

1. A process for making an aqueous solution of a keratin decomposition product free from pungent sulfur compounds which comprises hydrolyzing keratin in an aqueous medium at a temperature of 100° to 200° C. to form an aqueous solution of keratin hydrolysate and pungent sulfur-containing compounds, establishing a pH of 7 to 12 in said solution and adding to said solution an amount of epoxide sufficient to react with and substantially deodorize said pungent sulfur-containing compound.

2. A process according to claim 1 wherein said epoxide is epichlorhydrin.

3. A process according to claim 1 wherein said epoxide is ethylene oxide.

4. A process according to claim 1 wherein said epoxide is propylene oxide.

5. A process according to claim 1 wherein after said epoxide is reacted with said sulfur-containing compounds a bivalent metal salt is added to said solution to stabilize foam made from the protein hydrolysate.

6. A process as claimed in claim 1 wherein the hydrolysis is performed in an alkaline aqueous medium.

* * * * *